United States Patent [19]

Mitchell

[11] 4,401,551

[45] * Aug. 30, 1983

[54] SOLVENT EXTRACTION METHOD

[75] Inventor: David S. Mitchell, San Rafael, Calif.

[73] Assignee: Chevron Research Company, San Francisco, Calif.

[*] Notice: The portion of the term of this patent subsequent to Feb. 19, 1997 has been disclaimed.

[21] Appl. No.: 75,624

[22] Filed: Sep. 14, 1979

[51] Int. Cl.³ .............................................. C10G 1/04
[52] U.S. Cl. ................................................ 208/11 LE
[58] Field of Search ................................... 208/11 LE

[56] References Cited

U.S. PATENT DOCUMENTS

| | | | |
|---|---|---|---|
| 1,514,113 | 11/1924 | Trumble | 208/11 LE |
| 2,965,557 | 12/1960 | Price | 208/11 LE |
| 3,070,541 | 12/1962 | Price | 208/11 LE |
| 3,553,099 | 1/1971 | Savage et al. | 208/11 LE |
| 3,875,046 | 4/1975 | Rosenbloom | 208/11 LE |
| 4,036,732 | 7/1977 | Irani | 208/11 LE |
| 4,189,376 | 2/1980 | Mitchell | 208/11 LE |

FOREIGN PATENT DOCUMENTS 793812  9/1968  Canada ........................... 208/11 LE Primary Examiner—Charles F. Warren
Assistant Examiner—Joseph A. Boska
Attorney, Agent, or Firm—D. A. Newell; S. R. LaPaglia; J. W. Ambrosius

[57] ABSTRACT

A method for extracting bitumen from bituminous sand is disclosed, in which the bituminous sand is contacted with previously recovered bitumen at a temperature sufficient to maintain the previously recovered bitumen as a liquid, and the resulting liquids are separated from the resulting solids.

8 Claims, 1 Drawing Figure

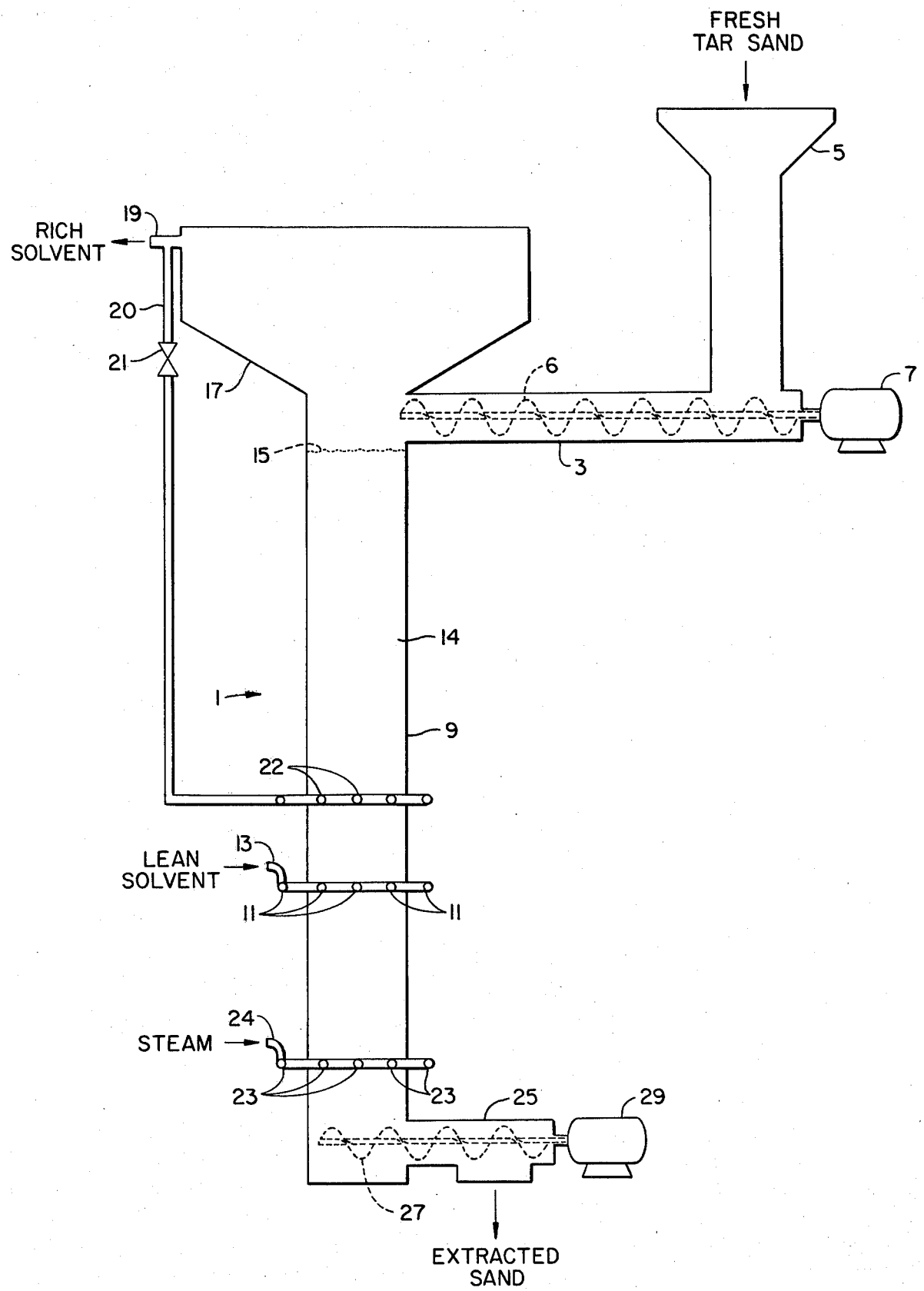

SOLVENT EXTRACTION METHOD

BACKGROUND OF THE INVENTION

The present invention relates to a method for extracting bitumen from bituminous sand.

Hydrocarbons and hydrocarbonaceous oils may be recovered from association with hydrocarbon-containing solids such as tar sands, oil shale and the like, and can be used as substitutes or supplements for petroleum and petroleum derivatives. One key factor in any practical system for solvent extraction of large amounts of hydrocarbons from solids is the economical recovery of solvent from the residual solids. Another important factor is recovering as much of the hydrocarbonaceous material as possible.

One tar sand solvent-extraction process previously proposed involves mixing a solvent with the tar sand and then draining off the resulting mixture of solvent and extracted hydrocarbons (bitumen). After being drained off, bitumen and solvent are then separated by fractionation. The bitumen is normally subjected to further conventional refining. After the bitumen and solvent have been drained from the solids, the solids are treated to remove any adhering solvent by steam stripping. Each extraction and drain stage can include countercurrent washing of the solids with solvent.

In U.S. Pat. No. 3,475,318, it is proposed to solvent-extract tar from tar sands using aliphatic hydrocarbons having 5 to 9 carbon atoms or mixtures of such aliphatics with up to 20% or aromatics having 6 to 9 carbon atoms. The tar sand is broken down into particles of a size between 0.03 and 0.25 inch diameter before solvent extraction. Solvent is passed over a bed of tar sand formed on a filter. The solid and tar are separated from the solvent residue by filtration. After filtration, the solids are stripped of volatiles with steam, which is employed at a rate of 3-21 pounds per 100 pounds of sand for a time of 0.5 to 3 minutes. Solvent is recovered by decantation from the subsequently condensed steam.

In U.S. Pat. Nos. 3,573,195 and 3,573,196 it is proposed to extract bitumen from bituminous sand by mixing the sand with water and hydrocarbon diluent containing dissolved normally gaseous ($C_1$–$C_3$) hydrocarbons, at a temperature of less than 40° F. and then introducing the resulting mixture into a body of water maintained at a temperature above 65° F. The normally gaseous hydrocarbons come out of solution and float the bitumen to the surface of the water for recovery. The hydrocarbon diluent is recovered by decantation from the water.

U.S. Pat. No. 3,875,046 discloses a solvent-extraction process using a single vertically extending extraction vessel. Downwardly flowing particulate tar sand is fluidized by an upwardly flowing liquid mixture of water and hydrocarbon solvent. The hydrocarbon solvent is selected to boil at a temperature below the boiling point of water. Steam is introduced into an intermediate level of the vessel to scour the solvent from the residual sand. Solvent is introduced above the steam introduction point, and water is introduced below the steam introduction point. Solvent condenses on the cooler sand higher up in the bed. The tar and hydrocarbon solvent are separated from water above the top of the tar sand bed by decantation and the solvent phase and water phase are removed. The water introduced into the lower end of the bed contains agglomerated fines. The wet, stripped sand is removed from the bottom of the vessel. The amount of hydrocarbon solvent employed is preferably that sufficient to control the viscosity of the tar recovered. The problem of solvent recovery is discussed. That is, this patent recognizes that a practical process for solvent extraction of hydrocarbon-containing solids necessarily must include some more or less effective means for recovering the organic solvent from the residual solids before the solids are discarded. The more solvent that is lost with the solid residues, the less economical will be a given solvent-extraction process.

Single solvents for bitumen are often overly selective for fractions of bitumen, whereas it is advantageous to extract as much hydrocarbonaceous material as possible from the sand. For example, lighter hydrocarbon solvents tend to extract the lighter bitumen fractions selectively, leaving potentially valuable hydrocarbonaceous materials, such as asphaltines, in the residue.

U.S. Pat. No. 3,117,922 discloses a bitumen recovery operation in which tar sand is first extracted with a higher-boiling hydrocarbon solvent on a moving filter belt and then washing the residual solids with a lower-boiling hydrocarbon solvent. U.S. Pat. No. 3,131,141 discloses contacting tar sand with a gas oil solvent and further contacting the residue with a liquefied, normally gaseous hydrocarbon solvent.

SUMMARY OF THE INVENTION

In one embodiment, the present invention concerns a method for extracting bitumen from bituminous sand comprising contacting the bituminous sand with previously recovered bitumen at a temperature sufficient to maintain the previously recovered bitumen as a liquid, and separating the resulting liquids from the resulting solids.

In another embodiment, the present invention concerns an improvement in a method I previously developed for solvent-extracting bitumen from bituminous sand. The extraction method in which the invention is used includes the steps of (a) maintaining a vertically extending packed bed of bituminous sand in a vertically extending zone and introducing bituminous sand into an upper portion of the bed; (b) introducing a vaporizable liquid solvent having a boiling point below 275° F. into the upper portion of the bed; (c) providing a substantially continuous gaseous phase in contact with a lower portion of the bed; (d) maintaining a substantially continuous liquid phase comprising the solvent in contact with the upper portion of the bed above the gaseous phase, the liquid phase and the gaseous phase having an interface at a vertically intermediate level of the bed, extracting bitumen from the bituminous sand by passing the solvent through the upper portion of the bed, and removing a liquid including the solvent and from the extraction zone; (e) preventing the liquid phase from flowing downwardly through the lower portion of the bed by maintaining the gaseous phase at a pressure sufficient to support the liquid phase thereon, and vaporizing solvent adhering to solids in the lower portion of the bed; and (f) removing the solids from the extraction zone from the lower portion of the bed. The present invention may be embodied as an improvement in the method described above by introducing into an intermediate level of the liquid phase bitumen which has been previously extracted and removed from the extraction zone, and introducing at least a portion of the solvent into the liquid phase below the intermediate level of the liquid phase.

As discussed in my copending application Ser. No. 909,890, filed on May 26, 1978, now U.S. Pat. No. 4,189,376 the complete disclosure of which is hereby incorporated in this specification, bitumen can be efficiently extracted from bituminous sand in a single vessel with extremely small solvent losses in the inorganic residue. By (1) heating a lower portion of a bed of solids to strip solvent from the solids, and (2) maintaining a substantially continuous gaseous atmosphere in contact with the solids in the lower portion of the bed, a substantially continuous liquid solvent phase can be maintained above the gaseous phase, supported on the gaseous phase. Liquid solvent entering the gaseous phase adhering to solids is vaporized and stripped off the solids. Vaporized solvent returns to the liquid phase higher in the vessel and condenses. The bed of tar sand is either continuously moved downward or alternately held static and moved downward. As disclosed in Ser. No. 909,890, the solvent can be conveniently vaporized and stripped off sand in the lower portion of the bed and a substantially continuous gaseous atmosphere can be maintained at the desired pressure by introducing steam into the lower portion of the bed. When using steam as a vaporizing and stripping medium and as a gaseous-phase-forming medium, the solvent is preferably selected to have a boiling point below that of water at the pressure used.

According to the present invention, I have now found that use of previously recovered bitumen to dissolve bitumen allows excellent bitumen recovery, particularly of the asphaltenes fraction of the bitumen. For example, recovery of bitumen from the solvent extraction process disclosed in Ser. No. 909,890, particularly recovery of the heavier, asphaltenes fraction of bitumen, is enhanced by recycling a portion of the previously extracted bitumen for use as a solvent supplement. In order to facilitate recovery of freshly extracted and previously extracted, recycled bitumen, in carrying out a preferred embodiment of the present invention using the process disclosed in Serial No. 909,890, I have found it advantageous to introduce at least a portion of the solvent into the liquid phase at a vertical level lower than the level at which the recycled bitumen is introduced.

Further objects, embodiments and advantages of the present invention will be apparent from the following description of the drawing and detailed description of the invention.

THE DRAWING

The attached drawing shows a schematic side view of a solvent-extraction system employing a preferred embodiment of the present invention.

Referring to the drawing, there is shown a vertically extending solvent extraction zone such as a vessel or column 1. Tar sand is fed into an upper level of the vessel by a conduit 3, connected to a supply hopper 5. The tar sand is conveyed from the hopper 5 into the vessel 1 by a screw-feed mechanism 6 located within the conduit 3 and driven by a motor 7. The feed mechanism may be operated continuously or intermittently. A vaporizable liquid solvent such as hexane is introduced into a vertically elongated portion 9 of the column 1 through a plurality of radially spaced inlets 11, each of which is connected to a feed manifold 13, which leads to a supply of solvent (not shown). The upper end of a bed 14 comprising subdivided feed solids is maintained below the level of the conduit 3 and above the level of the solvent inlets 11, the upper end of the bed 14 being indicated by a line at 15. The vessel 1 includes a larger-diameter clarifying section 17 at its top end, to allow liquid containing both solvent and bitumen to be decanted, for separation from entrained fine solids, before the liquid is removed from the top of the clarifying section through an outlet 19. According to a preferred embodiment of the present invention, a portion of the extracted bitumen in the bitumen-solvent mixture in the outlet conduit 19 is passed into a bitumen recycle conduit 20. The amount of the bitumen-solvent liquid mixture to be recycled is regulated by a valve 21 on the conduit 20. The remainder of the bitumen-solvent liquid is withdrawn from the system. The recycled portion of the bitumen-solvent mixture is introduced into the vessel 1 through a plurality of radially spaced inlets 22. Steam is introduced into the column 1 through a plurality of radially spaced inlets 23, each of which is connected to a steam feed manifold 24. Stripped residual solids are removed from the bottom of the column 1 through a conduit 25. The residual solids are conveyed from the column by a screw conveyor 27 which is driven by a motor 29. The conveyor 27 may be operated continuously or intermittently.

DETAILED DESCRIPTION OF THE INVENTION

The present invention is particularly adapted for use in extracting the extractable liquid or liquefiable hydrocarbonaceous materials, normally termed "tar" or "bitumen", from the naturally occurring mixture of tar, or bitumen, and inorganic particulate solids (e.g., sand, silt and clay) known as tar sands or bituminous sands. Deposits of such hydrocarbonaceous sands are found at several locations in the United States, Canada and other parts of the world. The extractable components in tar sand, as will be readily appreciated by those skilled in the art, often include organic compounds containing oxygen, nitrogen, sulfur, metals chelates and various other hetero-substituted organic compounds in addition to compounds which can be strictly classified as hydrocarbons.

As used herein, the term "previously recovered bitumen" means bitumen which has been separated from substantially all inorganic solids by any means, e.g., by solvent extraction, hot water or cold water type separation, or the like. The term specifically includes bitumen which is in admixture with a liquid solvent after having been previously extracted.

The invention can be carried out in any convenient zone or vessel. A preferred embodiment of the invention, such as the one depicted in the drawing, may most conveniently be carried out in a vertically extending confined space, such as an extraction zone formed by a vertically oriented vessel, pipe, conduit, chamber, etc. Generally, any type of conventional vessel, conduit or chamber is suitable, providing that it is adapted to hold a substantially vertically extending bed of the bituminous sand to be solvent extracted and is adapted to contain the liquid solvent and a heated gaseous atmosphere at temperatures and pressures employed. A variety of vessels, conduits, chambers, reactors and the like suitable for use to provide an extraction zone employed in the present extraction method will be readily apparent to those skilled in the art.

In a broad aspect, the invention includes contacting previously recovered bitumen with bituminous sand and separating the resulting liquids from the resulting solids. The conditions, such as temperature and pressure, may be varied widely, but the temperature must be sufficient so that the previously recovered bitumen is maintained as a liquid. The resulting liquids can be separated from the resulting solids by any convenient procedure, such as filtration, centrifugation, gravity settling, etc.

In carrying out a preferred embodiment of the invention, such as that shown in the drawing, bituminous sand is passed into the upper portion of the extraction zone, and a bed comprising the non-extractable, inorganic components of the sand is maintained in the extraction zone. Preferably the particulate solids are maintained in the extraction zone as a packed bed. Thus, solids higher up in the bed are preferably at least partially supported by solids lower in the bed, as opposed to the solids being ebullated or fluidized by liquid or gaseous materials in the extraction zone. Ebullation and fluidization are undesirable in that they disperse fine solids in the solvent-bitumen liquid mixture. In one mode of operation, the bed of solids is preferably maintained with particles substantially continuously moving downwardly through the extraction zone. In this mode, the particles preferably move downwardly in substantially plug flow. It will be appreciated that in a bed with a relatively large horizontal cross-sectional area, different portions of the bed may be moving downwardly at somewhat different rates, even when a packed bed is used. Tar sand to be solvent extracted may be introduced into the bed and residual solids may be removed from the bed, continuously or periodically or at any convenient time, in any convenient manner, e.g., by a screw conveyor, star feeder, rotating grate, etc. Preferably, when residual solids are removed from the bed, they are removed relatively uniformly from a complete cross-section of the bed, so that plug-type flow of solids downwardly through the vertical extraction zone is facilitated. Plug-type solids flow using a packed bed of solids is particularly advantageous in the present method, in that fewer fine solids are entrained in the moving liquid mixture of solvent and bitumen. It will be understood that, while the bed comprises primarily the non-extractable solids, the bed may also include solid, unextracted fractions of hydrocarbonaceous materials. This is particularly the case closer to the upper end of the bed, and in embodiments in which the bitumen has a high boiling point prior to contact with solvent, heating, or extraction.

In another mode of carrying out a preferred embodiment of the type shown in the drawing, the bed of solids is preferably alternately moved downwardly and held substantially static. The length of time the bed is held static and the length of time the bed moves downward in the alternating moving-static mode can be varied to permit optimum extraction of bitumen in the liquid phase and to permit optimum vaporization of solvent liquid from the residual solids in the gas phase. Preferably, the alternating of downward movement and holding stationary can be carried out in a periodic manner, but such is not necessary. In some cases, the pressure of the gas phase is sufficient to impede or halt the downward movement of the bed. In such cases, the pressure can be alternately increased and decreased, with the bed moving downward during the lower pressure periods and remaining static during the higher pressure periods.

In the higher-lower pressure mode, the interface between the gas phase and the liquid phase can be made to move higher in the bed during the higher pressure, stationary bed periods, and when the pressure is decreased and the bed moves downward, then the interface between the gas phase and the liquid phase also moves downward, in some cases at a faster rate than the bed. In embodiments using steam to provide the gas phase, the flow of steam can be alternately increased and decreased or alternately turned on and off, whereby the movement of the bed and the vertical level of the gas-liquid interface can be controlled.

Further, in carrying out a preferred embodiment of the present improved method, such as that illustrated in the attached drawing, vaporizable liquid solvent having a normal boiling point below 275° C. may be introduced into an upper portion of the bed of solids. The exact locus or vertical level (or levels) at which liquid solvent is introduced must be sufficiently spaced from the bottom of the bed to provide space for formation of a gaseous phase below the solvent introduction level and allow space sufficient for vaporization and separation of any adhering solvent from the solids below the solvent inlet, and sufficiently spaced from the liquids outlet to allow effective contact between the solvent and solids in the upper portion of the bed. The relative position of the solvent inlet or inlets, with respect to the recycled bitumen inlet or inlets is also critical in carrying out the present invention, and is discussed more fully below.

In embodiments using a solvent, the best solvent for any particular type of bituminous sand can be selected by one skilled in the art according to the type of bituminous sand to be extracted in a given case. The solvent must be vaporizable to permit its use and should have a normal boiling point below at most 275° C., and preferably below 235° C. Representative of generally suitable solvents are: (1) hydrocarbons, including, for example, $C_4$–$C_{10}$ or higher aliphatics such as pentanes, hexanes, heptanes, octanes, olefins and cyclo-olefins such as methylcyclopentane, naphthenes such as cyclo-pentane, cyclohexane, alkylcyclohexanes, as well as $C_6$–$C_{10}$ or higher aromatics such as benzene, toluene, xylenes, ethylbenzene, $C_4$–275° C. boiling petroleum fractions such as naphthas, gasoline fractions, etc., especially $C_4$–95° C. fractions, (2) $C_4$–275° C. synthetic hydrocarbon fractions such as may be derived from pyrolysis, gasification, liquefaction or extraction of tar sand, coal, oil shale and the like, especially $C_4$–95° C. fractions; (3) halogen-substituted hydrocarbons such as carbon tetrachloride, chloroform, trichlorofluoromethane, ethyl chloride, ethylene dichloride, methylene chloride, perchloroethylene, trichloroethylene; (4) alcohols, such as methanol, ethanol, isopropanol, butanol, pentanol, hexanol, etc., phenol, alkylphenols; (5) esters such as methyl acetate, ethyl acetate, isopropyl acetate, butyl acetate, vinyl acetate; (6) ketones, such as acetone, methylethylketone; (7) ethers, such as tetrahydrofuran; (8) carbon disulfide; (9) dimethylformamide; (10) polyols, gylcol ethers, etc. It is especially to be noted that mixtures of two or more of the solvent compounds or fractions or classes of solvent compounds or fractions discussed above are often particularly suitable for use in providing a suitable solvent in the present improved method. For example, mixtures of aromatic and aliphatic hydrocarbons, or mixtures of alcohols with hydrocarbons, such as phenol-benzene mixtures, are quite suitable.

Surface-active agents, whether termed "surfactants", "wetting agents", etc., can be employed. For example, a surfactant can be mixed with the solvent to enhance the solvent properties or to enhance removal or organic liquids from pores of nonextracted solids. Suitable surface-active agents can be, for example, inorganic hydroxide salts, carboxylic acids, sulfuric esters, alkane sulfonic acids and salts, alkylaromatic sulfonic acids and salts, organic and inorganic ammonium salts, alkali metal silicates, phosphoric acids and salts, amine salts, and the like. Specific examples of suitable surface-active agents are sodium laural sulfate, polyoxyethylene alkylphenols, dodecyl trimethyl ammonium chloride, alkylaryl naphthenic sulfonate, tetrasodium pyrophosphate, sodium tripolyphosphate, potassium pyrophosphate and sodium silicate, sodium carbonate, alkali metal hydroxides, and alkaline earth metal hydroxides. Emulsion-breaking components may also be used in the system, as by combining them with the solvent in an effective amount. Examples of suitable de-emulsifiers include polyethoxyalkylane, diethyl ethanolamine, polyols, and polyoxypropylene glycols.

Solvents which are insoluble (or immiscible) or only slightly soluble (or only slightly miscible) in water are particularly preferred. Preferably the solvent used has a normal boiling point, or normal end boiling point, below the normal boiling point of water. For example, hexane and cyclohexane are very suitable as to boiling point. In one preferred embodiment, the normal boiling point or normal end boiling point of the solvent is at least 14° C. below the normal boiling point of water. Preferably the solvent employed has a specific gravity of less than 1.0.

In a preferred embodiment employing a solvent, preferred solvents include pentanes, hexanes, benzene, cyclopentane, cyclohexane and methyl cyclopentane, and olefins and cyclo-olefins, and particularly mixtures of two or more of the above in any proportions. Hydrocarbon fractions having a boiling range between about 35° C. and about 95° C., such as petroleum fractions available in petroleum refineries, or hydrocarbon fractions derived from coal, bitumen, etc., are particularly preferred solvents. A suitable solvent may, in many cases, be derived in whole or in part from extracted hydrocarbons obtained in the present extraction operation from tar sands or the like. A suitable solvent material may, for example, be derived by fractionation, catalytic cracking, hydrocracking and/or other conventional, separation, refining or conversion treatment of the extracted material. Such solvents may, of course, be enhanced by the addition of other solvent-type materials such as phenol.

According to the invention, previously recovered bitumen is employed to extract bitumen. In a preferred embodiment, as depicted in the attached drawing, a portion of the bitumen previously extracted and removed from the extraction zone is introduced back into an intermediate level of the solvent-containing liquid phase in the extraction zone. Most conveniently, previously extracted bitumen can be recycled to the extraction vessel in admixture with solvent, so that separation of solvent from bitumen in the portion of the bitumen-solvent mixture to be recycled, is unnecessary. The non-recycled portion of the bitumen-solvent mixture can be recovered from the extraction operation for use or further treatment as described in greater detail below. The bitumen recycle can be introduced back into the extraction vessel at a single vertical level or at plural vertical levels, through a single inlet or plural inlets.

In some cases, previously recovered bitumen and a vaporizable solvent are both employed. While it is convenient to recyle extracted bitumen without separating it from solvent, the previously recovered bitumen may alternatively be first separated from any solvent or water and then contacted with the bituminous sand to be extracted, as by introducing the bitumen, undiluted by solvent, into an intermediate level of the liquid phase in a vertical extraction zone. In carrying out a preferred embodiment as depicted in the drawing, in some cases, it may be desirable to introduce previously extracted bitumen into the liquid phase mixed with solvent in a predetermined bitumen/solvent ratio different from the bitumen/solvent ratio found in the bitumen-rich solvent liquid removed from the extraction vessel. In some cases, part of the solvent may be separated from the extracted bitumen, to provide a bitumen recycle having a higher bitumen/solvent ratio than found in the bitumen-rich solvent liquid removed from the vessel. In other cases, additional solvent can be added to the bitumen-rich solvent, so that the bitumen recycle stream has a lower bitumen/solvent ratio than does the rich solvent. The amount of bitumen recycled to the intermediate level of the liquid phase in the extraction vessel in carrying out a preferred embodiment, is regulated to provide optimum extraction of the higher-boiling, less easily extracted components of the bitumen, such as asphaltenes.

Another essential feature of the preferred embodiment of the present invention, of type depicted in the drawing, resides in introducing at least a portion of the solvent into the liquid extraction phase at a vertical level in the solids bed lower than the lowest vertical level at which recycled bitumen is introduced. By introducing solvent into the bed below the vertical level or levels at which the previously extracted bitumen recycle is introduced, it is possible to remove essentially all bitumen from the residual particulate solids before the solids pass from the liquid phase into the gaseous phase. Accordingly, at least a portion of the solvent is introduced into the liquid phase sufficiently below the bitumen recycle inlet or inlets to remove residual bitumen from the solids and carry it upwardly through the liquid phase. The amount of solvent introduced below the bitumen inlet, and the vertical spacing between the solvent inlet and the bitumen recycle inlet can be adjusted to employ the minimum necessary amount of solvent while insuring adequate bitumen removal from the solids. The amount of solvent introduced below the bitumen inlet relative to the amount of bitumen recycle and the vertical distance maintained between the solvent and bitumen inlets are not believed to be particularly critical, as long as good bitumen recovery is maintained. As discussed above, the solvent inlet must be high enough in the bed of solids to allow space for the gaseous phase below it.

The preferred embodiment of the invention can best be further described by reference to the drawing. It will be understood, however, that the scope of the invention is not limited to the embodiment shown. The invention can be carried out using many alternatives, modifications and equivalents of the depicted embodiment, as will be apparent to those skilled in the art from the present description.

Referring to the preferred embodiment of the invention shown in the drawing, fresh tar sand is introduced, either continuously or at regular or varying intervals, into the solvent extraction zone in the vessel 1 into the confined space provided by the vertically elongated section 9, by way of the conduit 3. Expended, residual sand is removed from the bottom of the section 9 through the conduit 25 either continuously or at intervals corresponding generally with the introduction of fresh tar sand. A bed of solid tar sand is maintained in the vessel 1, with the top end of the bed preferably kept at a level at about 15, sufficient fresh sand being supplied from the conduit 3 to compensate for the amount of residual sand removed by the conduit 25.

The tar sand is preferably introduced into the extraction system as particulate solids having a maximum average particle diameter of less than one-fourth inch. Of course, larger clumps of some tar sands will rapidly break down into particles of the desired small size when they contact the liquid solvent phase, so that prior comminution is often not necessary. Preferably the tar sand is introduced with a particle size range of between 20 and 100 mesh (Tyler Sieve Series), and particularly preferably the tar sand is introduced with a particle size range of about 50–60 mesh. The bed either continuously moves downwardly in the elongated portion 9 of the column or alternately moves and remains stationary. Preferably the bed is a lightly packed bed (i.e., a loosely packed bed), in which solids, when they move downwardly, do so in substantially plug flow at a rate of about 0.01 to about 1.0 foot per minute.

According to the preferred embodiment, lean, vaporizable solvent, boiling between 35° C. and 95° C., such as an organic liquid fraction derived from processing of bitumen by coking and distillation in a conventional manner is introduced, preferably as a liquid, into the bed at an intermediate vertical level through the inlet 11. Somewhat below the solvent inlet, the lower portion of the bed is heated to provide at least partial vaporization of the solvent and a substantially continuous gaseous phase is maintained in contact with a lower portion of the bed. That is, the gaseous phase substantially completely fills the interstitial spaces in the gaseous-phase region of the lower portion of the bed and is in contact with substantially all the solids in the gaseous-phase region of the lower portion of the bed. The solids in the lower portion of the bed can be heated by direct or indirect contact with a heating medium, and the substantially continuous gaseous atmosphere can be supplied by any suitable gas, such as nitrogen or steam. The gaseous phase preferably extends entirely across a horizontal cross-section of the extraction zone. That is, there is at least one complete horizontal cross-section in the lower portion of the extraction zone through which substantially no liquid solvent passes downwardly, with the interstices between solids in the bed being substantially completely gaseous. Preferably both the bed-heating requirement and provision of a gaseous phase in the extraction zone are accomplished by introducing steam into the extraction zone below the solvent inlet by way of the steam inlets 23. The steam is introduced at a temperature, rate and pressure sufficient to maintain a substantially continuous gaseous phase in contact with the lower portion of the bed and to support upon the gaseous phase a substantially continuous liquid phase comprising the solvent and any extracted and/or recycled bitumen, which is in contact with the upper portion of the bed above the gaseous phase. Steam is provided at a temperature and pressure sufficient to maintain a liquid-gas interface. Above the interface, a substantially continuous liquid phase is in contact with the bed, whereas below the interface a gaseous phase, comprising steam but generally including some solvent vapor, is in contact with the bed. The interstices of the solids in at least a lower part of the upper portion of the bed are substantially filled with liquid, so that the liquid phase is substantially continuous in the portion of the extraction zone holding any of the upper portion of the bed which is in contact with the solvent-containing liquid phase. Any liquid solvent which wets or is absorbed by the solids in the bed, when they pass below the interface, is vaporized rapidly. Solvent vapor in the gaseous phase is preferably returned upwardly to the liquid phase, giving off the latent heat to solids entering the gaseous phase and condensing back into the liquid phase. The amount of steam introduced need only be enough to heat the solids in the lower portion of the bed enough to vaporize solvent adhering to the solids and to support the liquid phase above the interface. The steam introduced may all condense to liquid water by the time it is removed from the system, forming a liquid-water phase. The water phase which is present below the resulting interface may be kept substantially free from solvent, since the water phase is preferably maintained at a temperature above the boiling point of the solvent, while the solvent may be prevented from entering the water phase if it is substantially immiscible with the water. In cases where a solvent is used which is soluble or partly soluble in water, the water phase may contain a substantial amount of solvent. Usually, the amount of liquid water formed by condensation of steam below the gaseous phase is not enough to completely fill the void spaces between the solids in the bed. Accordingly, the wetted portion of the bed may be partially in contact with liquid water and partially in contact with steam. In this case, a mixture of steam and liquid water is withdrawn along with the residual solids. Any solvent vapor mixed with this steam can then be recovered by condensing all the steam and solvent and separating the solvent from the condensate by decantation. Alternatively, the amount of heat introduced may be sufficient that substantially no water condenses in contact with the lower portion of the bed, and any water removed from the bed with the residual solids is in the form of steam. In this case, some solvent vapor is usually mixed with the steam and residual solids. The steam and solvent vapor may be condensed and any solvent can then be separated from the condensate by decantation.

In any case, it will be appreciated that a substantially continuous, water-rich liquid-phase region may, in some cases, be present in contact with a bottom part of the lower portion of the bed below the gaseous phase region. Preferably, however, the gaseous phase is in contact with substantially all the solids in the lower portion of the bed, i.e., below the liquid, solvent-rich phase.

According to the preferred embodiment of the invention, previously recovered bitumen mixed with solvent is introduced into the liquid phase through the inlets 22. The recycled, previously extracted bitumen acts as a particularly effective solvent for heavier, difficultly-extracted components in the fresh bitumen, such as the asphaltenes component. Freshly extracted and recycled bitumen are displaced and removed from the downwardly moving subdivided solids by the action of relatively lean solvent moving upwardly from the inlets 11. The resulting liquid mixture containing the freshly extracted bitumen, previously extracted bitumen and solvent thus passes upwardly through the liquid phase portion 14 of the packed bed of solids.

In the preferred embodiment, tar, or bitumen, is extracted from tar sand in the upper portion of the bed in contact with the liquid phase above the gas-solvent interface by the extractive action of the liquid hexane solvent and the recycled bitumen which move upwardly through the upper portion of the bed. Solvent and recycled bitumen are preferably introduced into the extraction column at combined rates low enough that the solids in the upper portion of the bed, especially solids located above the solvent inlets 11 and previously recovered bitumen recycle inlets 22, in contact with the upwardly moving part of the liquid solvent phase, are not substantially fluidized. In this way, the bed itself acts as a filter for solid fines.

In carrying out the preferred embodiment, it is not essential that the liquid solvent-bitumen phase 14 extend above the top of the bed of solids, but this is preferred, as it permits easy clarification of the liquid phase to remove solids before withdrawing the mixture of bitumen and solvent from the extraction zone. Thus, in the embodiment shown in the drawing, after the solvent, recycled bitumen, and freshly extracted bitumen pass upwardly above the top of the solids bed, the resulting liquid mixture of bitumen and solvent can be clarified, if desired, in the enlarged settling section 17 of the column 1. The extracted bitumen-rich liquid is removed from the column from an upper portion of the liquid phase through the conduit 19. According to the present invention, a portion 60 to 70 weight percent of the previously extracted bitumen-rich liquid is recycled through the line 20, at a rate regulated by the valve 21. The remainder of the bitumen-rich liquid is withdrawn from the extraction operation. The solvent may then be separated from bitumen in a conventional manner for further use in extraction, if desired. The tar recovered from the extraction operation may be further processed or refined, if desired, as by coking, hydrocracking, catalytic cracking, distillation or other well known techniques. The temperatures and pressures used in the extraction system in carrying out the preferred embodiment are not particularly critical, except that the upper, bitumen-rich liquid phase and the lower, gaseous phase must be maintained. The solvent and the bituminous sand to be extracted may be at ambient temperature and pressure prior to their introduction into the extraction vessel. The extracted, residual solids, having passed downwardly through the extraction zone, into the gaseous phase, are then removed from the bottom portion of the solids bed. Preferably the solids are removed from a complete cross-section of the bed at a relatively uniform rate, so that plug-type downward flow of the bed downward through the extraction zone is maintained during solids removal.

A preferred embodiment of the present invention having been described, numerous modifications and equivalents of the preferred embodiment within the scope of the invention will be apparent to those skilled in the art. The scope of the invention is defined by the appended claims.

What is claimed is:

1. A method for extracting bitumen from bituminous sand comprising the steps of (a) maintaining a vertically extending bed of bituminous sand in a vertically extending extraction zone and introducing bituminous sand into an upper portion of said bed; (b) introducing a vaporizable liquid solvent having a boiling point below 275° C. into said upper portion of said bed; (c) providing a substantially continuous gaseous phase in contact with a lower portion of said bed; (d) maintaining a substantially continuous liquid phase comprising said solvent in contact with said upper portion of said bed above said gaseous phase, said liquid phase and said gaseous phase having an interface at a vertically intermediate level of said bed, extracting bitumen from said bituminous sand by passing said solvent through said upper portion of said bed, and removing a liquid including said solvent and bitumen from said extraction zone; (e) preventing said liquid phase from flowing downwardly through said lower portion of said bed by maintaining said gaseous phase at a pressure sufficient to support said liquid phase thereon, and vaporizing solvent adhering to solids in said lower portion of said bed; (f) removing said solids from said vessel from said lower portion of said bed; and (g) introducing into an intermediate level of said liquid phase bitumen previously extracted and removed from said extraction zone, and introducing at least a portion of said solvent into said liquid phase below said intermediate level of said liquid phase. pg,24

2. An improved method according to claim 1 wherein said solvent is selected from at least one hydrocarbon having 5 to 10 carbon atoms.

3. An improved method according to claim 1 wherein said liquid phase extends above an upper end of said bed in said extraction zone and said liquid is withdrawn from said extraction zone above said upper end of said bed.

4. An improved method according to claim 1 wherein said bed is substantially continuously moving downward in said extraction zone.

5. An improved method according to claim 1 wherein said bed alternately moves downward in said extraction zone and remains substantially stationary in said extraction zone.

6. An improved method according to claim 1 wherein a portion of said solvent is introduced into said intermediate level of said liquid phase in admixture with bitumen.

7. An improved method according to claim 1 wherein a portion of said liquid including said solvent and bitumen removed from said extraction zone is introduced into said intermediate level of said liquid phase.

8. An improved method according to claim 1 wherein said vaporizable liquid solvent has a boiling range of 35° C. to 95° C.

* * * * *